US009221468B2

(12) United States Patent
Kirschbaum et al.

(10) Patent No.: US 9,221,468 B2
(45) Date of Patent: Dec. 29, 2015

(54) DAMAGE LIMITATION FOR A MOTOR VEHICLE IN A DANGEROUS SITUATION

(71) Applicant: ROBERT BOSCH GMBH, Stuttgart (DE)

(72) Inventors: Thomas Kirschbaum, Backnang (DE); Andreas Heyl, Ludwigsburg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/359,245

(22) PCT Filed: Sep. 27, 2012

(86) PCT No.: PCT/EP2012/069025
§ 371 (c)(1),
(2) Date: May 19, 2014

(87) PCT Pub. No.: WO2013/072112
PCT Pub. Date: May 23, 2013

(65) Prior Publication Data
US 2015/0051751 A1 Feb. 19, 2015

(30) Foreign Application Priority Data

Nov. 17, 2011 (DE) .......................... 10 2011 086 520

(51) Int. Cl.
| G05D 1/00 | (2006.01) |
| B60W 40/12 | (2012.01) |
| G08B 7/00 | (2006.01) |
| B60K 28/14 | (2006.01) |

(52) U.S. Cl.
CPC ................ *B60W 40/12* (2013.01); *B60K 28/14* (2013.01); *G08B 7/00* (2013.01)

(58) Field of Classification Search
CPC ................ B60R 21/013; B60R 16/023; B60R 2021/01311; B63R 21/0134; G07C 5/0816; G07C 5/0808; B60W 50/14; B60W 40/12; G08B 7/00; B60K 28/14
USPC ........... 701/1, 36, 45; 280/734; 340/435, 438, 340/439

See application file for complete search history.

(56) References Cited

U.S. PATENT DOCUMENTS

| 6,580,973 B2 * | 6/2003 | Leivian et al. .................... 701/1 |
| 2004/0124971 A1 | 7/2004 | MacTavish et al. |
| 2006/0293819 A1 | 12/2006 | Harumoto et al. |
| 2010/0063685 A1 * | 3/2010 | Bullinger ........................ 701/45 |

FOREIGN PATENT DOCUMENTS

| CN | 1423603 A | 6/2003 |
| CN | 1876462 A | 12/2006 |
| WO | WO01/60661 | 8/2001 |
| WO | WO2008/043795 | 4/2008 |

OTHER PUBLICATIONS

International Search Report for PCT/EP2012/069025, issued on Jan. 7, 2013.

* cited by examiner

*Primary Examiner* — Gertrude Arthur Jeanglaude
(74) *Attorney, Agent, or Firm* — Kenyon & Kenyon LLP

(57) ABSTRACT

A system for limiting damage in a hazard situation of a motor vehicle encompasses a first sensing device for sensing the hazard situation, a second sensing device for sensing a state of the motor vehicle, a processing device for identifying an action instruction on the basis of the hazard situation and of the state of the motor vehicle, and a conveying device for conveying the action instruction to a person in the vicinity of the motor vehicle. A method for limiting damage in a hazard situation of a motor vehicle encompasses steps of sensing the hazard situation, sensing a state of the motor vehicle, identifying an action instruction on the basis of the hazard situation and of the state of the motor vehicle, and conveying the action instruction to a person in the vicinity of the motor vehicle.

25 Claims, 2 Drawing Sheets

DAMAGE LIMITATION FOR A MOTOR VEHICLE IN A DANGEROUS SITUATION

FIELD OF THE INVENTION

The present invention relates to a system and a method for limiting damage in a hazard situation of a motor vehicle. The invention relates in particular to a system and a method for identifying a corresponding action instruction.

BACKGROUND INFORMATION

When a motor vehicle is operated, a hazard situation can occur in which inappropriate behavior by a person in the vicinity of the motor vehicle can worsen damage that has already occurred, or can cause additional damage to occur. For example, if the motor vehicle has caught fire after a collision, and if the fire has resulted from a burst nickel-metal hydride battery, an attempt at extinguishing with water can spread the fire further or result in an explosion. A damaged lithium-ion battery into which only a small quantity of water penetrates can heat up considerably, thus creating the risk of a fire or deflagration. Water can react hazardously both with lithium and with fluorine that may be contained in the electrolyte of the lithium-ion battery.

While a hazardous materials placard is generally mounted on a commercial vehicle and can provide instructions as to appropriate behavior in an emergency situation, such marking is not at present being used on passenger vehicles. Given the large number of possible hazard situations, and the complex action instructions associated therewith, a static marking is also not necessarily expedient for a passenger vehicle. For example, the motor vehicle can get into a hazard situation that has resulted from a malfunction of a system of the motor vehicle, for example a steering failure. The hazard situation can also arise because it was necessary to stop, for example because another vehicle has experienced an accident.

In a hazard situation of this kind, human beings tend to experience shock and may make inappropriate decisions or perform inappropriate actions.

German Patent No. 20 2005 005 572 discloses an apparatus for a motor vehicle which outputs an instruction for performing first aid in the event of a traffic accident.

The object on which the invention is based is that of describing a system and method for improved provision of appropriate action instructions in the case of a hazard situation of a motor vehicle.

SUMMARY

A system for limiting damage in a hazard situation of a motor vehicle encompasses a first sensing device for sensing the hazard situation, a second sensing device for sensing a state of the motor vehicle, a processing device for identifying an action instruction on the basis of the hazard situation and of the state of the motor vehicle, and a conveying device for conveying the action instruction to a person in the vicinity of the motor vehicle.

Because the state of the motor vehicle is taken into account, the action instruction can be relevant in improved fashion. This makes it possible to instruct the person to behave in such a way that any damage that has already occurred is not aggravated and the person him- or herself is not endangered, and optionally to take precautionary measures to avoid further damage to property or harm to persons.

In a preferred embodiment the conveying device encompasses at least two output devices for redundant output of the action instruction. A probability that an output is no longer possible because of the hazard situation that has already occurred can thereby be decreased. The two output devices can follow different physical principles, for example optical and acoustic, so that a disrupted communication channel of one of the output devices does not negatively affect the understandability of the specific action instruction.

In a further preferred embodiment the system encompasses a removable digital medium for storing the action instruction, in order to enable conveyance of the action instruction by conveyance of the medium.

The medium can, for example, encompass a flash memory that is mounted externally accessibly at a predetermined location on the vehicle. The digital medium can be accessed quickly and easily, so that the medium can be read out, and the action instruction thus received, outside a hazard region of the motor vehicle.

A method according to the present invention for limiting damage in a hazard situation of a motor vehicle encompasses steps of sensing the hazard situation, sensing a state of the motor vehicle, identifying an action instruction on the basis of the hazard situation and of the state of the motor vehicle, and conveying the action instruction to a person in the vicinity of the motor vehicle.

The method can be executed in particular on the above-described system. In a preferred embodiment, the method is executed on one or more systems on board the vehicle, the systems also being associated with further subsystems of the motor vehicle. Thanks to the interconnection of the method with multiple subsystems, the sensing both of the hazard situation and of the state of the motor vehicle can occur on a wider information basis, and can thus be more detailed and more selective.

Preferably, the action instruction is furthermore identified on the basis of a design feature of the motor vehicle. Such a feature can relate to at least one of: the design, an equipment feature, an operating mode, or an energy reservoir for driving the motor vehicle. If the vehicle is equipped with a rear-mounted engine, for example, there is no need to warn about contact with hot components in the front area. If the motor vehicle is operable electrically, then in the event of a collision involving the motor vehicle it may be necessary to warn about leaking electrolyte fluid, but such a fluid can generate different hazards from a liquid fuel that can emerge after a collision involving a motor vehicle having an internal combustion engine. The action instruction can thereby be tailored and outputted individually for the particular motor vehicle.

In an embodiment, the action instruction relates to a technical manipulation of the motor vehicle. A risk that can arise from further operation or manipulation of a partly damaged motor vehicle can thereby be reduced.

In an embodiment, the action instruction is conveyed to another motor vehicle in the vicinity of the first motor vehicle. It is thereby possible for an action instruction to be given specifically to a person who, with a high probability, possesses an appropriate freedom of action. It is thus possible to take into account the fact that an occupant of the motor vehicle in the above-described hazard situation might be capable of only limited or in fact no action.

Conveyance can preferably occur wirelessly. An existing infrastructure, for example a cell of a mobile radio network or FM radio, can be used for this. Quick and simple conveyance can thereby occur, optionally without additional infrastructure to be installed.

The method can further encompass: identifying multiple action instructions, prioritizing the action instructions in accordance with a risk associated with disregarding them and/or in accordance with an assumed scope of a consequential damage, and conveying the action instructions in order of decreasing priority. The urgency of different action instructions can thereby be reinforced. The output of less urgent action instructions can be postponed so that the most urgent action instruction in each case can be conveyed immediately.

The hazard situation can be sensed on the basis of at least one of: a crash signal, an actuation of an input device, a fault message of a component of the motor vehicle, and a message of another vehicle in the vicinity of the motor vehicle.

A plurality of different sources can thereby be used for identifying the hazard situation, so that on the one hand the hazard situation can be reliably identified, and on the other hand an instruction as to the nature of the hazard situation can be identified.

A computer program product according to the present invention encompasses program code means for carrying out the method described when the computer program product executes on a processing device or is stored on a computer-readable data medium.

DETAILED DESCRIPTION

Figure 1:
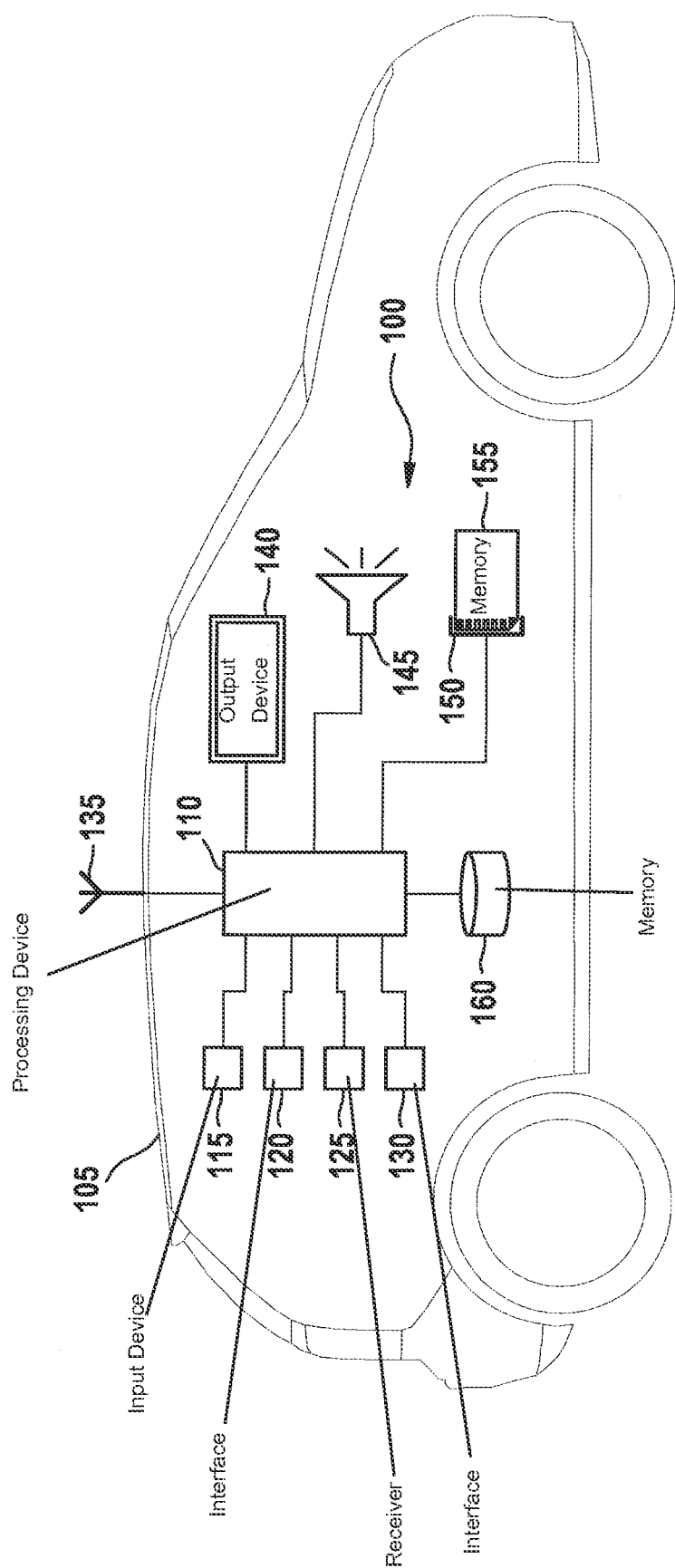
FIG. 1 shows a system on board a motor vehicle.

FIG. 1 shows a system 100 on board a motor vehicle 105 that preferably is a passenger vehicle. System 100 encompasses a processing device 110, an input device 115, an interface 120 to a subsystem of motor vehicle 105, a receiver 125, an interface 130 for receiving a crash signal, a transmitter 135, an optical output device 140, an acoustic output device 145, an interface 150 for a removable digital memory medium 155, and a configuration memory 160.

In some embodiments, not all of the elements recited are present in system 100. In a minimal configuration, system 100 encompasses at least processing device 110, configuration memory 160, at least one of devices 115 to 130, and at least one of devices 135 to 150.

Devices 115 to 130 are provided for sensing a hazard situation of motor vehicle 105. A hazard situation of this kind can relate to an accident involving motor vehicle 105, an accident involving another motor vehicle in the vicinity of motor vehicle 105, or a defect on board motor vehicle 105. The hazard situation is characterized in that motor vehicle 105 must be treated or operated differently than in normal operation in order to avoid or minimize harm to persons or damage to property in the vicinity of motor vehicle 105. Input device 115 is set up for actuation by a person on board motor vehicle 105. This can be a button or switch, for example the switch that activates a warning flasher system of motor vehicle 105. Alternatively, input device 115 can also be integrated into a human-machine interface of a subsystem of motor vehicle 105, for example into a car radio or a navigation system. In this case, optical output device 150 can be encompassed by the same subsystem.

Interface 120 for connection to a subsystem of motor vehicle 105 is set up to accept a message, in particular an error message of the subsystem. Based on the error message, the hazard message can be not only sensed but also more accurately classified. In an embodiment, a query as to a parameter or state of the system can also be carried out via interface 120. For example, it is possible to ascertain whether a drive motor of motor vehicle 105 is in operation, and under what parameters, for example at what temperature, it is being operated.

Receiver 125 is set up for receiving a signal, in particular an emergency signal, from another motor vehicle. Receiver 125 can be part of a car-to-car (C2C) infrastructure. If an emergency signal of another motor vehicle is received via receiver 125, motor vehicle 105 can also find itself in a hazard zone, for example when it approaches the location of the other motor vehicle.

Interface 130 is set up to accept a crash signal. The crash signal can signal an accident or an impact of motor vehicle 105 against an obstacle. The signal can also be more differentiated and can encompass, for example, a catalog of safety measures performed or not performed, for example activation of an antilock system, triggering of an airbag, or triggering of a belt tensioner.

Devices 135 to 150 are set up to convey an action instruction to a person in the vicinity of motor vehicle 105. Devices 135 to 150 that are depicted can be provided in system 100 in any combination. Not all devices 135 to 150 that are described need to be implemented, and each of devices 135 to 150 can also be provided several times in order to increase redundancy.

Transmitter 135 is set up to send out the action instruction, preferably in wireless form. Transmitter 135 can encompass, for example, a wireless computer communication interface (WLAN, Bluetooth, or WIMAX). Transmitter 135 can also be provided separately from motor vehicle 105, for example as an occupant's mobile telephone, and can be connected in wireless or wire-conducted fashion to motor vehicle 105 in order to provide an external wireless connection.

Transmitter 135 can be set up to send out the action instruction via a mobile telephone network, and to send out the action instruction, for example, via short message service (SMS), multimedia messaging (MMS), or in another manner. The action instruction can, for example, be sent out to all receivers present in a current radio cell of a cell-based mobile telephone network. In another embodiment, transmitter 135 can be set up to send out radio signals, for example, on FM or via DVB-T to all reachable receivers, in particular car radios, in a region around motor vehicle 105. Transmitter 135 can also be part of a car-to-car infrastructure.

Acoustic output device 145 is preferably directed into the interior of motor vehicle 105, but can also be directed outward. Action instructions are preferably outputted via acoustic output device 145 in clear text, preferably in a predetermined language.

In a preferred embodiment, interface 150 for removable digital memory medium 155 is mounted on motor vehicle 105 in such a way that access to and removal of medium 155 is possible from outside motor vehicle 105. An action instruction can be conveyed by the fact that the action instruction is written onto digital memory medium 155, whereupon memory medium 155 is removed and taken to a reading device where the action instruction is outputted, for example, optically or acoustically.

Configuration memory 160 contains technical information regarding motor vehicle 105. This information can encompass, for example, design features of motor vehicle 105, for example which of the wheels of motor vehicle 105 are drivable, or geometric external dimensions of motor vehicle 105. The information can also, however, relate to an equipment feature of motor vehicle 105, for example a number of installed seats or a convenience or safety system of motor vehicle 105. Lastly, the information can also encompass fundamental technical parameters such as a drive mode or energy reservoir of motor vehicle 105.

Processing device 110 preferably encompasses a programmable microcomputer. Processing device 110 can be encompassed by a further subsystem of motor vehicle 105 or co-utilized thereby. Processing device 110 can, for example, be part of an engine control system or a navigation system of motor vehicle 105. Processing device 110 is set up to identify, by way of devices 115 to 130, whether a hazard situation exists for motor vehicle 105, and preferably also to differentiate what is notable about that hazard situation. For this, processing device 110 identifies, by way of devices 115 to 130, a technical state of motor vehicle 105. On the basis of the identified hazard situation and the identified state of the motor vehicle, an action instruction is then identified on the basis of the information stored in configuration memory 150 and is conveyed by way of one of devices 135 to 150 to a person in the vicinity of motor vehicle 105.

Figure 2:
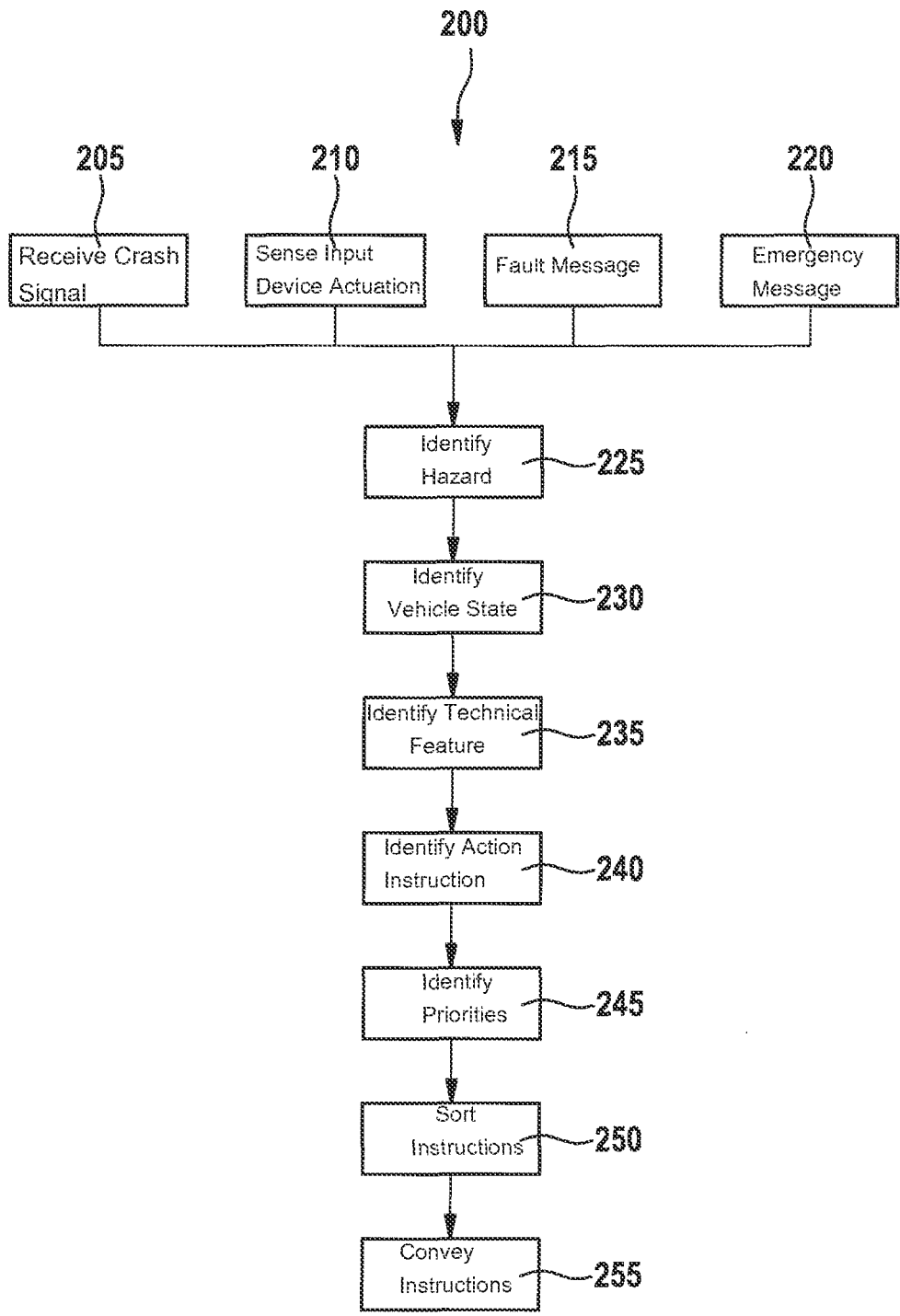
FIG. 2 is a flow chart of a method for the system of FIG. 1.

The functioning of system 100 will now be explained in more detail in the form of a method 200. FIG. 2 is a flow chart of a method 200 that is set up to execute on processing device 110 of system 100 on board motor vehicle 105 in FIG. 1.

Method 200 can be initiated by one of four different steps 205 to 220.

In step 205 a crash signal is received by way of interface 130. In step 210 the actuation of input device 115 is sensed. In step 215 a fault message of a subsystem of motor vehicle 105 is received by way of interface 120. In step 220 a message regarding an emergency situation or hazard situation in the vicinity of motor vehicle 105 is received by way of receiver 125. With regard to the different possibilities, combinations, and embodiments of steps 205 to 220, reference is made to the description above of devices 115 to 130, referring to FIG. 1.

On the basis of the information made available in steps 205 to 220, in a step 225 a hazard situation for motor vehicle 105 is identified.

In a subsequent step 230 a vehicle state of motor vehicle 105 is identified. This identification can encompass a querying of sensors on board the motor vehicle and, in particular, communication with one or more subsystems of the motor vehicle by way of interface 120.

In a step 235, relevant technical features of motor vehicle 105 are identified. This means that those design- and configuration-related features of motor vehicle 105 which have an influence on the specific vehicle state, or are affected by the specific vehicle state, are made available. If the vehicle state indicates a fire on board motor vehicle 105, for example, the nature of the energy reservoir provided for storing drive energy on board motor vehicle 105 can be important.

Based on the information now available, in a following step 240 one or more action instructions are identified. The action instructions are directed toward a person in the vicinity of motor vehicle 105, and a distinction can be made between a person on board motor vehicle 105 and another person outside motor vehicle 105, so that different action instructions can be outputted internally and externally.

The action instruction can also contain information, for example, as to how many persons are presumably still present in motor vehicle 105, and the kind of assistance required at motor vehicle 105. For example, a request can be made to summon a doctor, a mechanic, someone to help with extraction of the passenger involved in the accident, or someone to help with accident insurance.

The action instruction can urge the receiver not to get closer to motor vehicle 105, for example because fuel has leaked, a high-energy electrical lead might be exposed, or a drive battery of motor vehicle 105 might start to burn. Another action instruction can relate to transferring motor vehicle 105 into a safe area, for example to an open area, a shoulder on an expressway, into a so-called emergency station for electric vehicles, or generally away from a number of people that may be present in the vicinity of motor vehicle 105.

In a further example, the action instruction can encompass extinguishing the motor vehicle not with water but instead with sand or with a metal-fire extinguisher, for example because a battery fire is involved.

In yet another example, the action instruction relates to alerting the fire department, the police, or emergency medical personnel, and providing those personnel with vehicle-specific information, for example a vehicle category, a risk potential, a battery location, a layout of high-energy electrical leads, and other technical information. Further information for the alerted personnel can relate to a necessary training of a service person, or to a preferred rescue route. The action instruction can also be indicated implicitly by outputting fault states that have been identified on board motor vehicle 105.

If several action instructions have been identified, it is recommended that in a subsequent step 245, priorities for the identified action instructions be identified, and that in a further step 250 the identified action instructions be sorted by priority. It is thereby possible to ensure that the highest-priority action instruction is conveyed first.

In a concluding step 255, the identified action instructions are conveyed by way of one of devices 135 to 150 to a person in the vicinity of motor vehicle 105.

What is claimed is:

1. A system for limiting damage in a hazard situation of a motor vehicle, comprising:
   a first sensing device for sensing the hazard situation;
   a second sensing device for sensing a state of the motor vehicle;
   a processing device for identifying an action instruction on the basis of the hazard situation and of the state of the motor vehicle; and
   a conveying device for conveying the action instruction to a person in a vicinity of the motor vehicle;
   wherein at least one of:
      the hazard situation of the motor vehicle is damage that has already occurred to the motor vehicle; and
      the conveying device is configured to direct output of the action instruction to a person outside of the motor vehicle.

2. The system as recited in claim 1, wherein the conveying device includes at least two output devices for redundant output of the action instruction.

3. The system as recited in claim 1, further comprising:
   a removable digital medium for storing the action instruction, in order to enable conveyance of the action instruction by conveyance of the medium.

4. The system as recited in claim 1, wherein the first sensing device is configured to sense the damage that has already occurred to the motor vehicle.

5. The system as recited in claim 4, wherein the hazard situation is that the motor vehicle has caught fire.

6. The system as recited in claim 4, wherein the hazard situation is a malfunction of the system of the motor vehicle.

7. The system as recited in claim 4, wherein the hazard situation is a fluid leak of the motor vehicle.

8. The system as recited in claim 1, wherein the conveying device is configured to direct the action instruction to the person outside of the motor vehicle.

9. The system as recited in claim 8, wherein the conveying device is further configured to output another action instruction to a person inside of the motor vehicle, so that the person inside the motor vehicle and the person outside the motor vehicle receive different action instructions.

10. The system as recited in claim 8, wherein the conveying is performed via a cell of a mobile radio network.

11. The system as recited in claim 8, wherein the conveying is performed by wireless transmission to a device located outside the motor vehicle.

12. The system as recited in claim 11, wherein the conveying is performed by broadcasting to a plurality of receivers located outside of the motor vehicle, but within a defined region of the motor vehicle.

13. The system as recited in claim 12, wherein the defined region is a radio cell of a cell-based network in which the motor vehicle is located.

14. The system as recited in claim 11, wherein the conveying is performed via at least one of short message service and multimedia messaging.

15. The system as recited in claim 8, wherein the conveying is performed by broadcasting a radio signal to a plurality of radio receivers reachable from the motor vehicle.

16. The system as recited in claim 8, wherein the conveying is performed by Digital Video Broadcasting-Terrestrial to a plurality of radio receivers reachable from the motor vehicle.

17. The system as recited in claim 8, wherein the conveying is performed by operation, via a connection to the motor vehicle of a mobile telephone of an occupant of the motor vehicle, of the mobile telephone.

18. A method for limiting damage in a hazard situation of a motor vehicle, comprising:
sensing the hazard situation;
sensing a state of the motor vehicle;
identifying an action instruction on the basis of the hazard situation and of the state of the motor vehicle; and
conveying the action instruction to a person in a vicinity of the motor vehicle;
wherein at least one of:
the hazard situation of the motor vehicle is damage that has already occurred to the motor vehicle; and
the conveying includes directing output of the action instruction to a person outside of the motor vehicle.

19. The method as recited in claim 18, further comprising identifying the action instruction on the basis of a design feature of the motor vehicle.

20. The method as recited in claim 18, wherein the action instruction relates to a technical manipulation of the motor vehicle.

21. The method as recited in claim 18, further comprising conveying the action instruction to another motor vehicle in the vicinity of the motor vehicle.

22. The method as recited in claim 21, wherein the conveying occurs wirelessly.

23. The method as recited in claim 18, further comprising:
identifying multiple action instructions;
prioritizing the action instructions in accordance with a risk of consequential damage associated with disregarding them; and
conveying the action instructions in order of decreasing priority.

24. The method as recited in claim 18, wherein the hazard situation is sensed on the basis of at least one of:
a crash signal,
an actuation of an input device,
a fault message of a component of the motor vehicle, and
a message of another vehicle in the vicinity of the motor vehicle.

25. A non-transitory computer-readable medium on which are stored program code executable on a processing device and, when executed on the processing device, causing the processing device to perform a method for limiting damage in a hazard situation of a motor vehicle, the method comprising:
sensing the hazard situation;
sensing a state of the motor vehicle;
identifying an action instruction on the basis of the hazard situation and of the state of the motor vehicle; and
conveying the action instruction to a person in a vicinity of the motor vehicle;
wherein at least one of:
the hazard situation of the motor vehicle is damage that has already occurred to the motor vehicle; and
the conveying includes directing output of the action instruction to a person outside of the motor vehicle.

* * * * *